US006012701A

United States Patent [19]

Reiter

[11] Patent Number: 6,012,701

[45] Date of Patent: Jan. 11, 2000

[54] FUEL INJECTION VALVE

[75] Inventor: Ferdinand Reiter, Markgroeningen, Germany

[73] Assignee: Robert Bosch GmbH, Stuttgart, Germany

[21] Appl. No.: 09/037,545

[22] Filed: Mar. 10, 1998

[30] Foreign Application Priority Data

Mar. 27, 1997 [DE] Germany .......................... 1 97 12 922

[51] Int. Cl.[7] ............................ F02M 69/46; F16K 31/06

[52] U.S. Cl. .................. 251/129.21; 239/900; 239/585.4

[58] Field of Search ................................ 239/900, 585.4; 251/129.21, 368, 284; 137/375

[56] References Cited

U.S. PATENT DOCUMENTS

| | | | |
|---|---|---|---|
| 3,795,383 | 3/1974 | Lomabard et al. | 251/129.21 X |
| 4,984,744 | 1/1991 | Babitzka et al. | 251/129.21 X |
| 5,314,122 | 5/1994 | Winter | 239/900 X |
| 5,330,153 | 7/1994 | Reiter | 251/129.21 |
| 5,526,837 | 6/1996 | Eaker | 251/129.21 X |
| 5,544,816 | 8/1996 | Nally et al. | 251/129.21 X |
| 5,566,920 | 10/1996 | Romann et al. | 251/129.21 |
| 5,692,723 | 12/1997 | Baxter et al. | 251/129.21 X |
| 5,875,975 | 3/1999 | Reiter | 251/129.21 X |

FOREIGN PATENT DOCUMENTS

| | | |
|---|---|---|
| 0 602 001 | 6/1994 | European Pat. Off. . |
| 29 43 155 | 5/1980 | Germany . |
| 43 25 942 | 2/1995 | Germany . |
| 44 26 006 | 1/1996 | Germany . |
| 2 237 325 | 5/1991 | United Kingdom . |
| WO 96/06278 | 2/1996 | WIPO . |

*Primary Examiner*—John Rivell
*Assistant Examiner*—Meredith H. Schoenfeld
*Attorney, Agent, or Firm*—Kenyon & Kenyon

[57] ABSTRACT

A fuel injection valve includes a casing, a coupling for connection to a fuel supply line, a valve seat carrier arranged downstream from the coupling, and a valve seat body mounted on the valve seat carrier and having a valve seat face. The fuel injection valve also includes a valve closing body which can move between a closed position in contact with the valve seat face and an open position elevated from the valve seat face. The coupling includes a first sheet metal part, and the valve seat carrier includes a second sheet metal part. The sheet metal parts are shaped by a deformation stress exceeding the yield point of their material and they are joined together to form the casing.

18 Claims, 1 Drawing Sheet

Fig. 2
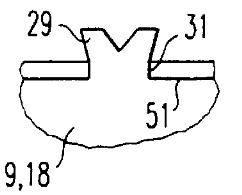
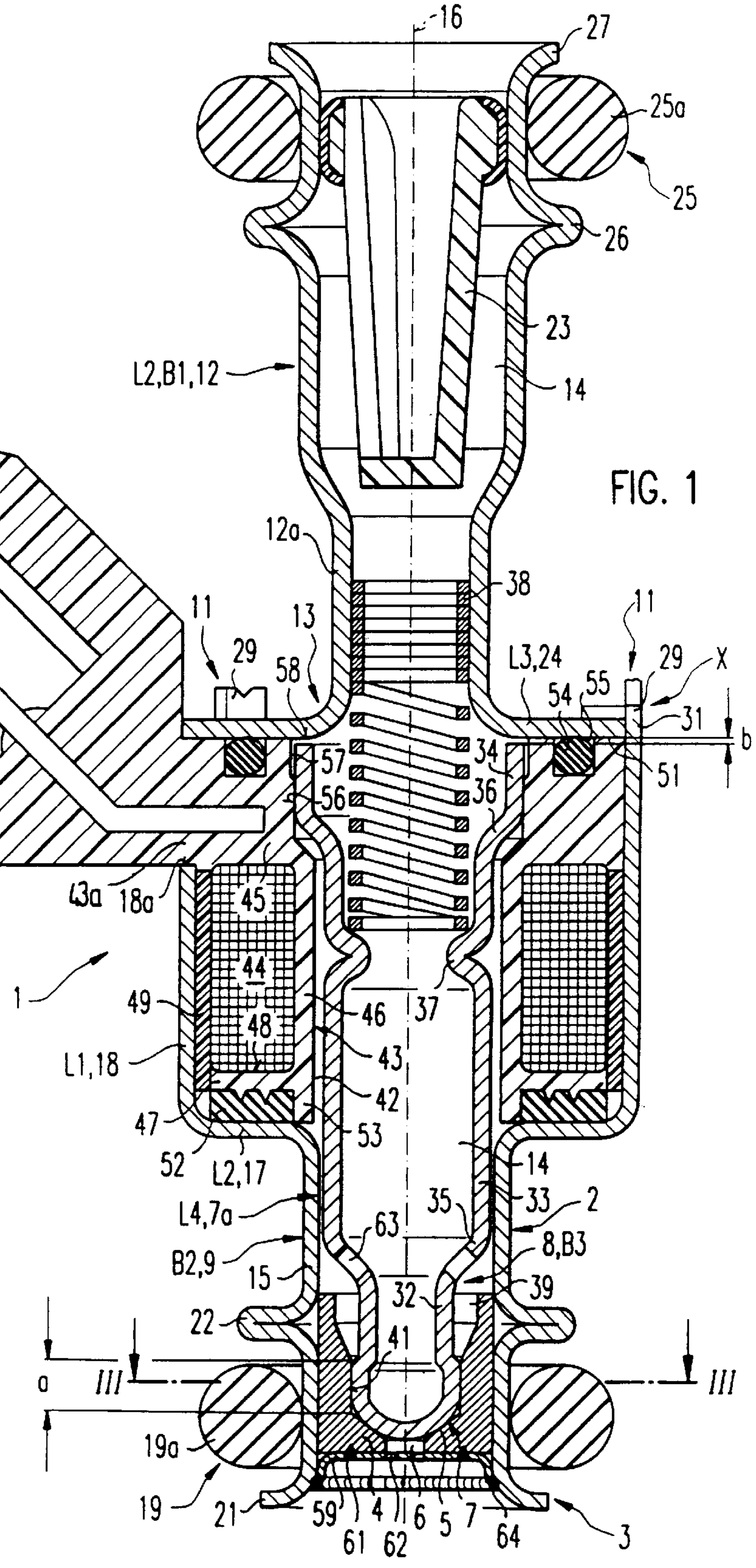
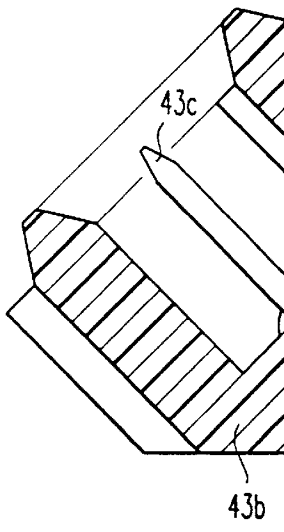
FIG. 1
Fig. 3
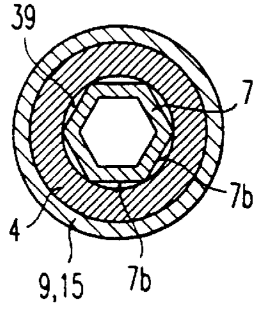

FUEL INJECTION VALVE

BACKGROUND INFORMATION

A conventional fuel injection valve is described in German Patent Application No. 43 25 842.

This conventional fuel injection valve is a typical mass-produced valve (along with its individual parts) which is simple and inexpensive to manufacture and has a reliable performance. The casing of this conventional fuel injection valve includes a number individual parts joined together. The coupling and the valve seat carrier are typical joined using lathe procedure and are internally and externally machined. This conventional design provides relatively thick walls in the fuel injection valve, and causes a considerable consumption of material and a substantial weight. It may be feasible to reduce the wall thickness by using an optimal machining process. However, such process would be very labor-intensive and time-consuming and leads to high manufacturing costs.

In addition, special design requirements apply to a fuel injection valve with a conventional electromagnetic actuation for an opening movement of a valve closing body to provide conducting elements of ferromagnetic material for a electromagnetic coil to conduct a magnetic flux. The coupling of the conventional fuel injection valve with its downstream cylindrical end extends as a coil core passing through the magnetic coil. The valve seat carrier extends with an upper hollow cylindrical end section to a downstream end of the coil bobbin, an intermediate ring being arranged between the coil core and the valve seat carrier. In order to provide a guide for the magnetic flux for the upstream end of the magnetic coil and its outer periphery, at least one conducting element bridging the magnetic coil is externally provided in the conventional fuel injection valve. The individual parts of the fuel injection valve described above are tightly joined together by several mechanical joints, such as welds, with plastic extrusion coating being provided to sheath great lengths of the conducting element, the coupling and the valve seat carrier as an additional casing part to form the casing. This results in a multiple-part design.

German Patent Application No. 44 26 006 mentions that the valve needle and valve closing body of the conventional fuel injection valve described above can be manufactured from a one-piece deep-drawn part.

SUMMARY OF THE INVENTION

The fuel injection valve according to the present invention is advantageous in that the coupling and the valve seat carrier can be manufactured from simple and inexpensive starting parts and blanks which have a finished shaped form of a coupling and of the valve seat carrier by a deformation stress procedure that exceeds a yield point of the material, in particular by deep drawing. The design of the fuel injection valve according to the present invention allows a quick, simple and inexpensive manufacture, as well as the material being strengthened since the materials of the coupling and the valve seat carrier are stressed beyond the respective yield points. Accordingly, these two parts acquire a greater strength. This increase in strength makes it possible to design the respective parts with relatively thin walls to permit further savings in material and weight. No machining of the inside and outside lateral surfaces is necessary. A sheet steel billet or sleeve may serve as the metal blank or starting part, composed of a ferromagnetic metal in particular. In addition, the exemplary embodiment according to the present invention provides a simple design with a casing composed of only two parts and a simple assembly.

With the design of the fuel injection valve according to the present invention, it is possible to manufacture the fuel injection valve from only twelve individual parts and to join these parts with only two welds.

It is also possible and advantageous according to the present invention to shape the valve closing body by applying a deformation stress that exceeds the yield point of the material, preferably by deep drawing.

Another advantage of the shaping of the coupling and the valve seat carrier according to the present invention is that angular deformations and stepped diameters can be implemented in a material-saving manner. Accordingly, it is also possible to design the coupling and the valve seat carrier with angular wall sections so that the magnetic coil or the coil bobbin be accommodated in the valve seat carrier and the coil bobbin can be surrounded by the angular walls both axially and radially. Thus, the coil or coil bobbin made of ferromagnetic material forms conducting elements to conduct the magnetic flux.

It is further advantageous to use a valve needle having a single piece design with the valve closing body (i.e., a sheet metal part as the conducting element) arranged radially inward from the coil bobbin, for conducting the magnetic flux, so that the magnetic flux is conducted completely in three deep-drawn sheet metal parts. In an advantageous manner, the valve needle passing completely through the magnetic coil can function as an magnetic core. It is also possible to use the coil bobbin as a guide part for the valve needle.

It is also advantageous to design the respective transverse and longitudinal dimensions of the sheet metal parts so that the opening movement of the valve closing body is limited upstream by the coupling which forms a stop face or by an add-on piece. To increase the lifetime of the stop face, it is also advantageous to make the stop face of a hard material, to harden it, or to apply a permanent hard layer to it.

BRIEF DESCRIPTION OF THE DRAWINGS

FIG. 1 shows an axial section through a fuel injection valve according to the present invention.

FIG. 2 shows an enlarged side view of a cross-section labeled as X as illustrated in FIG. 1.

FIG. 3 shows an enlarged cross-sectional view along line III—III of FIG. 1.

DETAILED DESCRIPTION

As shown in FIG. 1, fuel injection valve 1 has a nozzle body 2 and is suitable for fuel injection systems of combustion engines with a compression of a fuel mixture and with a spark ignition. With its free end, nozzle body 2 forms spray end 3 of fuel injection valve 1. A valve seat body 4 has a conical valve seat face 5 which faces away from spray end 3 and which is adjacent to a recess 6 toward spray end 3. Valve seat face 5 cooperates with a valve closing body 7 which is partially spherical at least in the area next to valve seat face 5 in the embodiment according to the present invention, and it forms a hollow valve needle 8 with an integrally molded one-piece shaft 7*a*. Valve seat (closing) body 7 is arranged and secured in a sleeve-shaped valve seat carrier 9. On its end facing away from spray end 3, valve seat carrier 9 is connected to a sleeve-shaped coupling 12 to form a sleeve-shaped casing 13 in which there runs an axial through passage 14 for the fuel flow.

Valve seat carrier 9 with a round cross section increases stepwise in diameter in its upstream end area, thus forming (in the downstream end area) an essentially hollow cylindrical peripheral wall section 15 which is adjacent to an upstream second hollow cylindrical wall section 18 and a stepped wall section 17 arranged preferably at a right angle to the longitudinal center axis 16 of casing 13. In the downstream end area of valve seat carrier 9, there is a ring gasket 19, formed by an O ring 19*a*, for example, to seal the valve seat carrier 9 in a receptacle opening which accommodates it. To secure ring gasket 19 axially, two flanges 21, 22 with an axial distance between them are integrally molded on valve seat carrier 9 so they accommodate O ring 19*a* between them, with upstream flange 22 formed by an outer bead, preferably folded.

Coupling 12 likewise has the form of a cylindrical sleeve or a stepped cylinder with stepwise increases in cross section in its upstream end area to accommodate a filter 23 in the embodiment according to the present invention. A flange 24 integrally molded on the downstream end of coupling 12 has an outside diameter corresponding approximately to the outside diameter of the second peripheral wall section 18 of valve seat carrier 9. In the upstream end area, a ring gasket 25 is provided for coupling 12, preferably an O ring 25*a* surrounding coupling 12 to seal a fuel line (not shown) which can be pushed onto coupling 12. To secure sealing ring 25*a* axially, coupling 12 has two flanges 26, 27 which are spaced an axial distance apart and accommodate gasket 25*a* between them, with downstream flange 26 being formed by an outer bead, optionally folded.

Mechanical connection 11 between valve seat carrier 9 and coupling 12 is of a form-fitting type. As shown in FIG. 2, for this purpose, several connecting pegs 29 may be provided on at least one of coupling 12 and valve seat carrier 9 so they engage with each other in a form-fitting manner or extend over one another. In the embodiment according to the present invention, two or more, e.g., three connecting pegs 29 are integrally molded on valve seat carrier 9, distributed around the circumference, and they engage in the respective edge recesses 31 having a matching cross-sectional shape in flange 24 and are caulked or bent over on the side facing away from valve closing body 7 using at least one notch, and thus engage flange 24 in a form-fitting manner and secure flange 24 on valve seat carrier 9.

Valve needle 8 is designed with valve closing body 7 in the form of a one-part cylindrical or stepwise cylindrical sleeve with a downstream closed end. In its longitudinal direction, it has three peripheral wall sections 32, 33, 34 with different cross sections in succession, increasing progressively in cross section in the upstream direction, preferably with conical transitional areas 35, 36. The middle peripheral wall section 33 has an internal flange 37 formed by an internal bead. The middle and upstream peripheral wall sections 33, 34 have a hollow cylindrical cross-sectional shape.

Inside flange 37 serves as a shoulder and an abutment for a restoring spring 38 arranged upstream from it in the form of a spiral compression spring which is designed with an oversize diameter in the upstream end area relative to the inside diameter of peripheral wall 12*a*, which has a tapered cross section here, of coupling 12, and said spring is pressed into the hollow cylindrical peripheral wall 12*a*. The press fit for the restoring spring 38 resulting from the amount of oversizing of peripheral wall 12*a* is so tight that unintentional slippage of the end of the spring inserted into it is prevented under the stresses that result during operation of fuel injection valve 1, but it is possible to install restoring spring 38 by pushing it into the hollow cylindrical peripheral wall 12*a* with a certain axial pressing force. Fuel injection valve 1 is opened by the axial movement of valve needle 8 against the spring force of restoring spring 38.

As shown in FIG. 3, valve seat face 5 is formed by the shoulder of a recess 39 which is in sliding contact with the lateral surface of valve closing body 7 in a longitudinal section a extending upstream from valve seat face 5, which diverges upstream from that and ends at an axial distance from transitional area 35 of valve needle 8. Longitudinal section a forms an axial guide section 41 for valve closing body 7. To guarantee a passage for fuel in the area of this guide, the cross-sectional shape of either the inside lateral surface of recess 39 or preferably the outer circumferential surface in the radial outside wall area of the partially spherical valve closing body 7 is designed with a polygonal shape with tangential surfaces running between the comers on valve seat body 4 (not shown) or secantial surfaces 7*b* on valve closing body 7. With the embodiment according to the present invention, the radial equatorial area of the partially spherical valve closing body 7 is designed with a polygonal shape, e.g., a hexagonal shape.

An annular coil bobbin 43, preferably made of plastic, is arranged in free annular space 42 bordered radially by peripheral wall section 18 of valve seat carrier 9 and valve needle 8 on the one hand and by stepped wall section 17 of valve seat carrier 9 and flange 24 of coupling 12 on the other hand. A magnetic coil permitting electromagnetic actuation of valve needle 8 is embedded in annular coil bobbin 43. Coil bobbin 43 consists of an annular base part 45 which is in contact with flange 24 and peripheral wall section 18. A hollow cylindrical inside peripheral wall 46 extends downstream from the inside circumference of base part 45 and has a flange 47 bordering on an annular space 48 in which magnetic coil 44 is embedded and covered by a sheath 49 of an electrically nonconducting material, in particular a plastic.

The axial dimension of coil bobbin 43 may be such that the coil bobbin 43 fills the distance between flange 24 and stepped wall section 17. This permits sealing of the interior space of fuel injection valve 1 with respect to a joint 51 between valve seat body 4 and coupling 12. Ring seals are preferably provided on the axial end faces of coil bobbin 43, namely an O ring in each case here. With the embodiment according to the present invention, a quad ring 52 situated on an axial ring projection 53 of coil bobbin 43 is arranged on the downstream end face. Upstream an O ring 54 is arranged in a ring groove 55 that accommodates O ring 54 in the upstream end face of coil bobbin 43. Integrally molded on the side of coil bobbin 43 is a connecting neck 43 that extends outward through a suitable orifice 18*a* opening upstream in peripheral wall 18 and has a cable connector 43*b* with electric contact elements 43*c* connected to magnetic coil 44.

Valve needle 8 has a guide section 56 formed by coil bobbin 43. In the embodiment according to the present invention, guide section 56 is provided between the upstream peripheral wall section 34 and base part 45 on whose cylindrical inside peripheral surface, preferably with a reduced cross section, the cylindrical external peripheral surface of peripheral wall section 34 is in sliding contact. Base part 45 preferably is enlarged on the upstream area of its inside periphery, thus forming a free annular gap 57 for the upstream outside edge of valve needle 8. Between guide sections 41, 56, shaft 7*a* has a radial distance from coil bobbin 43 and from peripheral wall section 15.

The length of valve needle 8 is such that when its valve closing body 7 comes in contact with valve seat face 5, there is an axial distance b between valve needle 8 and flange 24 of coupling 12 corresponding to the valve needle stroke. Coupling 12, or its flange 24 in the embodiment according to the present invention, thus forms a stop 58 for the traveling movement of valve needle 8. Valve needle 8 thus extends completely through magnetic coil 44. Coupling 12 which conducts magnetic flux therefore does not form a core in the sense of known electromagnetically operated valves but is only a casing part that can be designed with thin walls. Valve needle 8 forms the magnetic core of magnetic coil 44. No special armature body to be mounted on valve needle 9 is necessary.

Valve seat carrier 9, coupling 12 and valve needle 8 are molded parts composed of a sheet of ferromagnetic metal, of ferromagnetic steel which can be shaped to its final form out of the material of a blank or prefabricated part, by a deformation stress that exceeds the yield point, e.g., a tensile or compressive stress, preferably by deep drawing. The blank or prefabricated part may be, for example, a flat billet or a tubular piece. Valve seat carrier 9, coupling 12 and valve needle 8 may be a one-part molded sheet metal part B1, B2, B3 of essentially the same wall thickness which can be manufactured quickly and easily by conventional shaping processes and has a relatively great strength and stability with a low weight. Secantial faces 7*b* can also be molded on valve closing body 7. It is also possible to manufacture secantial faces 7*b* by finishing machining.

To reduce wear and prolong service life, it is advantageous to harden the surfaces in the area of stop 58 on coupling 12 and/or on valve needle 8, in the area of the upstream end face and/or on the inside surface of flange 24 in this embodiment, or to provide these surfaces with a hard coating. For example, a layer produced by hard chrome plating is suitable for this purpose. Such a wear-resistant design may be omitted in the area of guide section 56 if coil bobbin 43 forming this guide section 56 is made of a plastic with good antifriction properties.

A perforated spray disk 59, which may be pot-shaped, for example, preferably made of steel, serves to secure valve seat body 4 axially; its peripheral edge is adapted to the inside cross-sectional size of valve seat carrier 9 and it is mounted on its inside wall, preferably by welding, in a preferably axially countersunk position on the spray end. To secure valve seat body 4 in the axial direction, it is joined to perforated spray disk 59 by welding, e.g., by a weld 61. At least one spray orifice 62, preferably multiple, e.g., four spray orifices 62 are provided in perforated spray disk 59. The valve seat part formed by valve seat body 4 and perforated spray disk 59 is connected tightly to valve seat carrier 9 by a peripheral weld 64, e.g., produced by a laser, in the area of perforated spray disk 59.

The sections of valve seat carrier 9, coupling 12 and valve needle 8 bordering on annular space 42, and in this embodiment according to the present invention, peripheral wall section 18, stepped wall section 17, flange 24 and shaft 7*a* of valve needle 8 form conducting elements L1, L2, L3, L4 for the magnetic flux of magnetic coil 44.

During operation, the fuel flows axially through coupling 12 and shaft 7*a* of valve needle 8 having an upstream orifice. Through-holes 63 in the jacket of shaft 7*a* are provided upstream from valve closing body 7, namely in the present embodiment, in the inclined transitional area 35 between the peripheral wall sections 32, 33, so that fuel flows axially in the direction of valve seat face 5. Fuel injection valve 1 is characterized by a simple arrangement and a small number of components in comparison with the known embodiments. There are also just a few welds, e.g., only two.

What is claimed is:

1. A fuel injection valve, comprising:

a coupling connected to a fuel supply line and composed of a first sheet metal part;

a valve seat carrier arranged downstream from the coupling and composed of a second sheet metal part;

a valve seat body mounted on the valve seat carrier and having a valve seat face; and a valve closing body movable between a closed position and an open position, the valve closing body contacting the valve seat face in the closed position, the valve closing body being elevated from the valve seat face in the open position, wherein the first and second sheet metal parts are formed by a deformation stress, the deformation stress exceeding a material yield point of each of the first and second sheet metal parts, the first and second sheet metal parts being joined together to form a casing.

2. The fuel injection valve according to claim 1, wherein the valve closing body is composed of a third sheet metal part, the third sheet metal part being shaped by a further deformation stress, the further deformation stress exceeding a further material yield point of the third sheet metal part.

3. The fuel injection valve according to claim 2, wherein at least one of the first sheet metal part, the second sheet metal part and the third sheet metal part is deep-drawn.

4. The fuel injection valve according to claim 2, further comprising:

limit stop elements being spaced an axial distance apart and formed on the first, second and third sheet metal parts.

5. The fuel injection valve according to claim 1, wherein the first sheet metal part is connected to the second sheet metal part in a form-fitting manner by a positive connection.

6. The fuel injection valve according to claim 5, wherein one of the first sheet metal part and the second sheet metal part provides at least one recesses, and further comprising:

connecting pegs extending through the at least one recess, the connecting pegs being provided on another one of the first sheet metal part and the second sheet metal part for engaging with the at least one recess.

7. The fuel injection valve according to claim 1, wherein the first sheet metal part includes a flange at a downstream end of the coupling.

8. The fuel injection valve according to claim 1, further comprising:

a coil bobbin including a magnetic coil and being situated in an annular space, the annular space being positioned at an upstream end area of the second sheet metal part, wherein the coil bobbin is surrounded by a peripheral wall section of the second sheet metal part.

9. The fuel injection valve according to claim 8, wherein the annular space includes a downstream side and an upstream side, the annular space being situated at least one of next to a stepped wall section of the second sheet metal part at the downstream side and next to a flange of the first sheet metal part at the upstream side, the flange being situated at a downstream end of the coupling.

10. The fuel injection valve according to claim 9, wherein the annular space is internally and radially bordered by a valve needle, the valve needle being connected in a single piece manner to the valve closing body.

11. The fuel injection valve according to claim 8, wherein the coil bobbin includes a connecting neck portion extending to provide a cable connector, and wherein the peripheral wall section has an orifice adjacent to the upstream end area of the peripheral wall section for extending the connecting neck portion through the orifice.

12. The fuel injection valve according to claim 1, wherein the first sheet metal part forms a stop element for providing an opening motion of the valve closing body, the valve closing body and a valve needle being designed as a single piece.

13. The fuel injection valve according to claim 12, wherein a surface of the first sheet metal part is one of hardened and layered with a hard layer at the stop element.

14. The fuel injection valve according to claim 10, wherein the valve needle is axially projected in a guide section at a further upstream end area formed by the coil bobbin.

15. The fuel injection valve according to claim 1, further comprising:

a restoring spring being situated upstream from the valve closing body and including an upstream end area, the upstream end area of the restoring spring being situated in the coupling using a clamping tension force, wherein the clamping tension force is predetermined for allowing the upstream end area of the restoring spring to be pressed into the coupling and for preventing a displacement in the coupling when the fuel injection valve is operational.

16. The fuel injection valve according to claim 8, wherein the valve needle completely passes through the magnetic coil and forms a magnetic core for the magnetic coil.

17. The fuel injection valve according to claim 12, wherein the valve needle completely passes through a magnetic coil and forms a magnetic core for the magnetic coil.

18. The fuel injection valve according to claim 1, wherein the fuel injection valve is an injection valve for a fuel injection system of an internal combustion engine.

* * * * *